(12) United States Patent
Richer (10) Patent No.: US 8,245,808 B2
(45) Date of Patent: Aug. 21, 2012

(54) SNOWMOBILE EXHAUST SYSTEM

(75) Inventor: Max Richer, Valcourt (CA)

(73) Assignee: Bombardier Recreational Products Inc., Valcourt (CA)

( * ) Notice: Subject to any disclaimer, the term of this patent is extended or adjusted under 35 U.S.C. 154(b) by 410 days.

(21) Appl. No.: 12/263,153

(22) Filed: Oct. 31, 2008

(65) Prior Publication Data

US 2010/0108427 A1    May 6, 2010

(51) Int. Cl.
*B62B 13/00* (2006.01)
*B60K 13/04* (2006.01)

(52) U.S. Cl. .......... 180/184; 180/182; 180/309

(58) Field of Classification Search ........... 180/182, 180/183, 184, 185, 186, 190, 309
See application file for complete search history.

(56) References Cited

U.S. PATENT DOCUMENTS

| | | | |
|---|---|---|---|
| 3,795,287 A * | 3/1974 | Rose | 181/283 |
| 3,810,518 A * | 5/1974 | Smale | 180/68.1 |
| 5,660,245 A * | 8/1997 | Marier et al. | 180/190 |
| 6,926,107 B2 | 8/2005 | Nishijima | |
| 7,063,178 B2 | 6/2006 | Etou | |
| 7,124,847 B2 | 10/2006 | Girouard et al. | |
| 2005/0199432 A1 * | 9/2005 | Abe et al. | 180/190 |
| 2008/0110687 A1 | 5/2008 | Miyashiro et al. | |

FOREIGN PATENT DOCUMENTS

CA    2059434 C   * 11/2005

* cited by examiner

*Primary Examiner* — Hau Phan
*Assistant Examiner* — Bryan Evans
(74) *Attorney, Agent, or Firm* — Osler, Hoskin & Harcourt LLP (57) ABSTRACT

A snowmobile has a four-stroke engine mounted in an engine cradle and an exhaust system connected to the engine. The exhaust system includes a generally U-shaped exhaust pipe extending forwardly from the engine to a first point disposed forwardly of the engine cradle, and of suspension assemblies of the skis, and extending rearwardly from the first point to a second point disposed rearwardly of a front of the engine cradle.

16 Claims, 6 Drawing Sheets

SNOWMOBILE EXHAUST SYSTEM

FIELD OF THE INVENTION

The present invention relates to snowmobile exhaust systems.

BACKGROUND OF THE INVENTION

Many prior art snowmobiles are powered by engines operating on the two-stroke principle. Two-stroke engines generate noise at relatively high frequencies while in operation. In order to reduce the noise generated by two-stroke engines and to control the performance characteristics of these engines, snowmobiles powered by these engines have an exhaust system that includes a tuned pipe and a muffler.

Recently, more snowmobiles are being powered by engines operating on the four-stroke principle. While in operation, four-stroke engines generate noise at lower frequencies than two-stroke engines. For this reason, and also due to the operation principle of four-stroke engines, tuned pipes are not well suited to provide noise reduction and performance control in four-stroke engines.

Since tuned pipes cannot be efficiently used, one way of reducing the engine noise in snowmobiles powered by four-stroke engines is to increase the volume, and therefore the dimensions, of the muffler. However, a larger muffler significantly increases the weight of the snowmobile, which negatively impacts the snowmobile's performance. Also, since the muffler is usually disposed inside the front cowling of the snowmobile which provides only limited space which makes it difficult to accommodate a muffler having large dimensions.

U.S. Pat. No. 6,926,107 B2 (the '107 patent), issued on Aug. 9, 2005 discloses a snowmobile having an exhaust system where the muffler is not disposed in the front cowling. In the '107 patent, the four-stroke engine of the snowmobile has been oriented such that the exhaust ports face toward a rear of the snowmobile. The exhaust pipes extend rearwardly from the exhaust ports and are then routed along the tunnel to a silencer box disposed at the back of the tunnel. However, since the exhaust ports of snowmobiles typically face towards a front of the snowmobile, the arrangement described in the '107 patent requires substantial redesign and changes in the lay-out of many of the components of the snowmobile, such as the tunnel.

Therefore, there is a need for a snowmobile having an exhaust system adapted to reduce the noise generated by four-stroke engines.

SUMMARY OF THE INVENTION

It is an object of the present invention to ameliorate at least some of the inconveniences present in the prior art.

It is also an object of the present invention to provide a snowmobile having an exhaust system that includes a generally U-shaped exhaust pipe extending forwardly from the engine so as to extend forwardly of the engine cradle and of the suspension assemblies of the snowmobile.

By providing an exhaust pipe routed as described above, the length of the exhaust pipe is sufficiently long to provide the desired noise reduction. Also, this permits the engine to be oriented with its exhaust ports facing forwardly, which reduces the amount of redesign and changes in layout of other components of the snowmobile. Finally, due to the relatively long length of the exhaust pipe, the exhaust gases are given more time to cool before entering the muffler. The acoustic waves travelling in cooler exhaust gases have a shorter wavelength for the same frequency, and acoustic waves with a shorter wavelength can be attenuated with a relatively simple muffler design (i.e. fewer internal chambers, smaller volume).

In one aspect, the invention provides a snowmobile having a frame including a tunnel and an engine cradle forward of the tunnel, a four-stroke engine mounted in the engine cradle, a drive track disposed below and operatively connected to the tunnel, the drive track being operatively connected to the engine for propulsion of the snowmobile, left and right skis connected to the frame, a left suspension assembly connecting the left ski to the frame, a right suspension assembly connecting the right ski to the frame, a straddle seat disposed on the tunnel above the drive track and rearwardly of the engine, a pair of footrests supported by the frame, a steering column operatively connected to the left and right skis, a handlebar connected to the steering column, and an exhaust system connected to the engine. The exhaust system includes a generally U-shaped exhaust pipe extending forwardly from the engine to a first point disposed forwardly of the engine cradle, and of the suspension assemblies, and extending rearwardly from the first point to a second point disposed rearwardly of a front of the engine cradle. The exhaust pipe has a substantially constant diameter.

In a further aspect, the second point is disposed rearwardly of the left and right suspensions.

In an additional aspect, an outlet of the exhaust pipe is disposed forwardly of the footrests.

In a further aspect, the exhaust pipe has first, second, third, fourth, fifth, and sixth portions. The first portion extends forwardly from the engine and towards a longitudinal centerline of the frame. The second portion extends forwardly from the first portion and away from the longitudinal centerline. The third portion extends forwardly from the second portion and towards the longitudinal centerline. The fourth portion extends rearwardly from the third portion and away from the longitudinal centerline. The fifth portion extends rearwardly from the fourth portion and towards the longitudinal centerline. The sixth portion extends rearwardly from the fifth portion and away from the longitudinal centerline. The first, second, and third portions are disposed on a first side of the longitudinal centerline and the fourth, fifth, and sixth portions are disposed on a second side of the longitudinal centerline.

In an additional aspect, a connection between the first and second portions is disposed forwardly of a connection between the fifth and sixth portions.

In a further aspect, the exhaust pipe is asymmetric about the longitudinal centerline.

In an additional aspect, the exhaust ports of the engine face towards a front of the snowmobile.

In a further aspect, the exhaust system includes an exhaust manifold having a single outlet fluidly communicating the exhaust ports with the exhaust pipe.

In an additional aspect, the exhaust system includes a pre-muffler fluidly communicating the outlet of the exhaust manifold with the exhaust pipe.

In a further aspect, a maximum diameter of the pre-muffler is greater than a diameter of the exhaust pipe, and a length of the pre-muffler is less than a length of the exhaust pipe.

In an additional aspect, the exhaust system includes a muffler fluidly communicating the exhaust pipe with the atmosphere.

In a further aspect, the muffler and the outlet of the exhaust manifold are disposed on opposite sides of a longitudinal centerline of the frame.

In an additional aspect, the muffler is disposed to one lateral side of the engine and forwardly of one of the footrests.

In a further aspect, a portion of the exhaust pipe extends inside the muffler. A length of the portion of the exhaust pipe extending inside the muffler is less than 20 percent of the length of the exhaust pipe.

In an additional aspect, each of the left and right suspension assemblies includes at least one A-arm. The first point is disposed forwardly of a portion of the A-arms.

In a further aspect, each A-arm defines a steering axis about which a corresponding one of the left and right skis pivots. The first point is disposed forwardly of the steering axes.

In an additional aspect, a cowling is connected to a forward portion of the frame and at least partially disposed around the exhaust pipe. A heat shield is disposed between the cowling and a portion of the exhaust pipe.

In a further aspect, the exhaust pipe is at least 1200 mm long.

In an additional aspect, a diameter of the exhaust pipe is less than 70 mm.

In a further aspect, the exhaust pipe reduces engine noise by at least 6 decibels.

For purposes of this application, the terms related to spatial orientation such as forwardly, rearwardly, left, and right, are as they would normally be understood by a driver of the snowmobile sitting thereon in a normal driving position.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
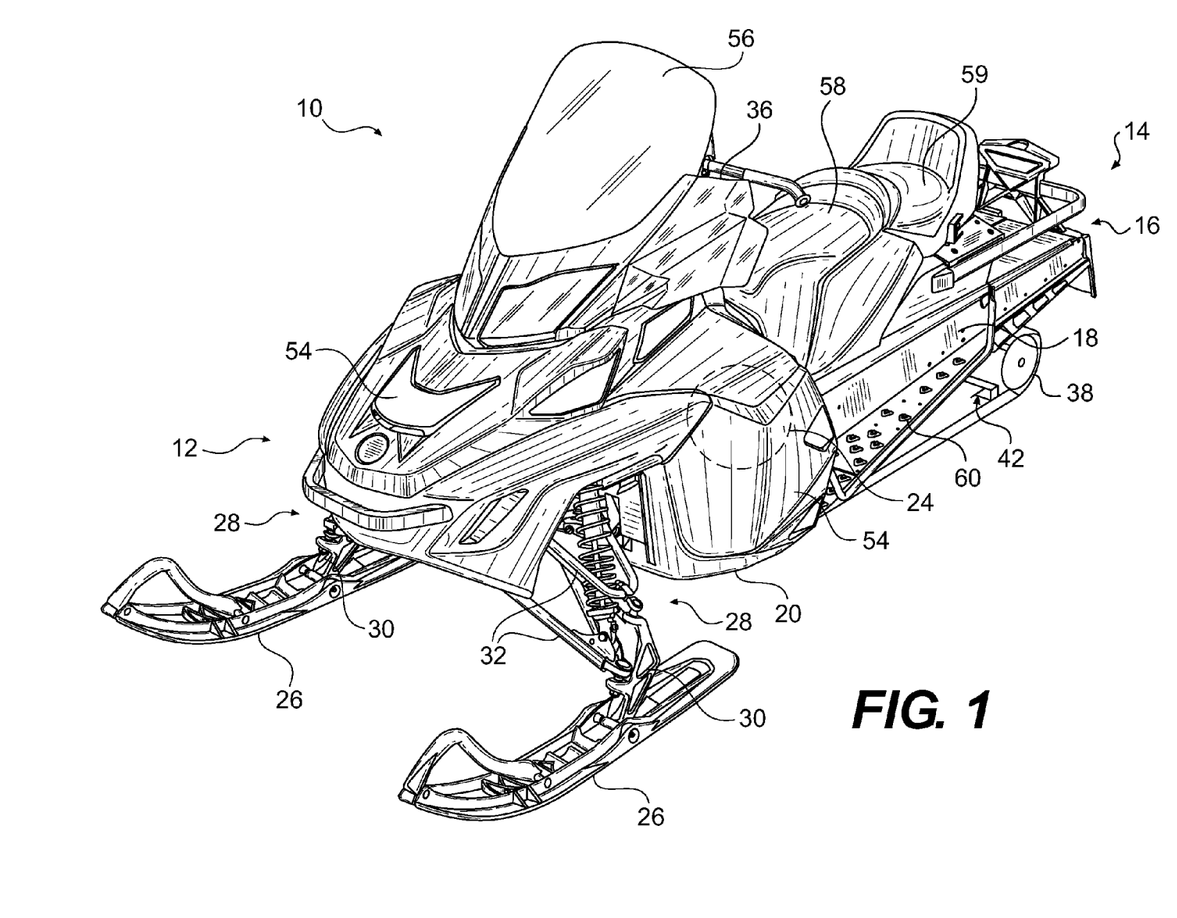
FIG. 1 is a perspective view, taken from a front, left side, of a snowmobile.

As shown in FIG. 1, a snowmobile 10, according to the present invention, includes a forward portion 12 and a rearward portion 14 which are defined consistently with a forward travel direction of the vehicle. The snowmobile 10 includes a frame (also known as a chassis) 16 which includes a rear tunnel 18, an engine cradle 20, and a sub-frame 22 (see FIGS. 2 and 3). An engine 24, which is schematically illustrated in FIG. 1, is carried by the engine cradle portion 20 of the frame 16 which forms part of an engine compartment. Two skis 26 are positioned at the forward portion 12 of the snowmobile 10 and are attached to the frame 16 through left and right front suspension assemblies 28. Each front suspension assembly 28 includes a ski leg 30, two A-arms 32 and ball joints (not shown) for operatively joining its ski leg 30 and A-arms 32. It is contemplated that other types of suspensions could be used. Each ski leg 30 is operatively connected to a steering assembly which includes a steering column 34 (FIGS. 2 and 3) connected to a handlebar 36. The handlebar 36 is used to rotate the ski legs 30 and thus the skis 26 in order to steer the vehicle.

An endless drive track 38 is positioned at the rear portion 14 of the snowmobile 10 under the tunnel 18. The endless drive track 38 is operatively connected to the engine 24 through a belt transmission system (not shown). The endless drive track 38 is driven to run about a rear suspension assembly 42 to propel the snowmobile 10.

At the front portion 12 of the snowmobile 10, a cowling 54, made of multiple parts, encloses the engine 24 and the belt transmission system, thereby providing an external shell that not only protects the engine 24 and the belt transmission system, but can also be decorated to make the snowmobile 10 more aesthetically pleasing. Typically, the cowling 54 includes a hood and one or more side panels that can be opened to allow access to the engine 24 and the belt transmission system when this is required, for inspection or maintenance of the engine 24 and/or the belt transmission system, for example. In the snowmobile 10 shown in FIG. 1, the side panels can be opened along a vertical axis to swing away from the snowmobile 10. A windshield 56 is connected to the cowling 54 near the front portion 12 of the snowmobile 10. Alternatively, the windshield 56 could be connected directly to the handlebar 36. The windshield 56 acts as a wind screen to lessen the force of the air on the rider while the snowmobile 10 is moving.

A straddle seat 58 is positioned atop the frame 16 and extends from the rear portion 14 of the snowmobile 10 to the cowling 54. A rear portion of the seat 58 provides a passenger seat 59. Two footrests 60 are positioned on opposite sides of the snowmobile 10 below the seat 58 to accommodate the driver's and passenger's feet.

Figure 2:
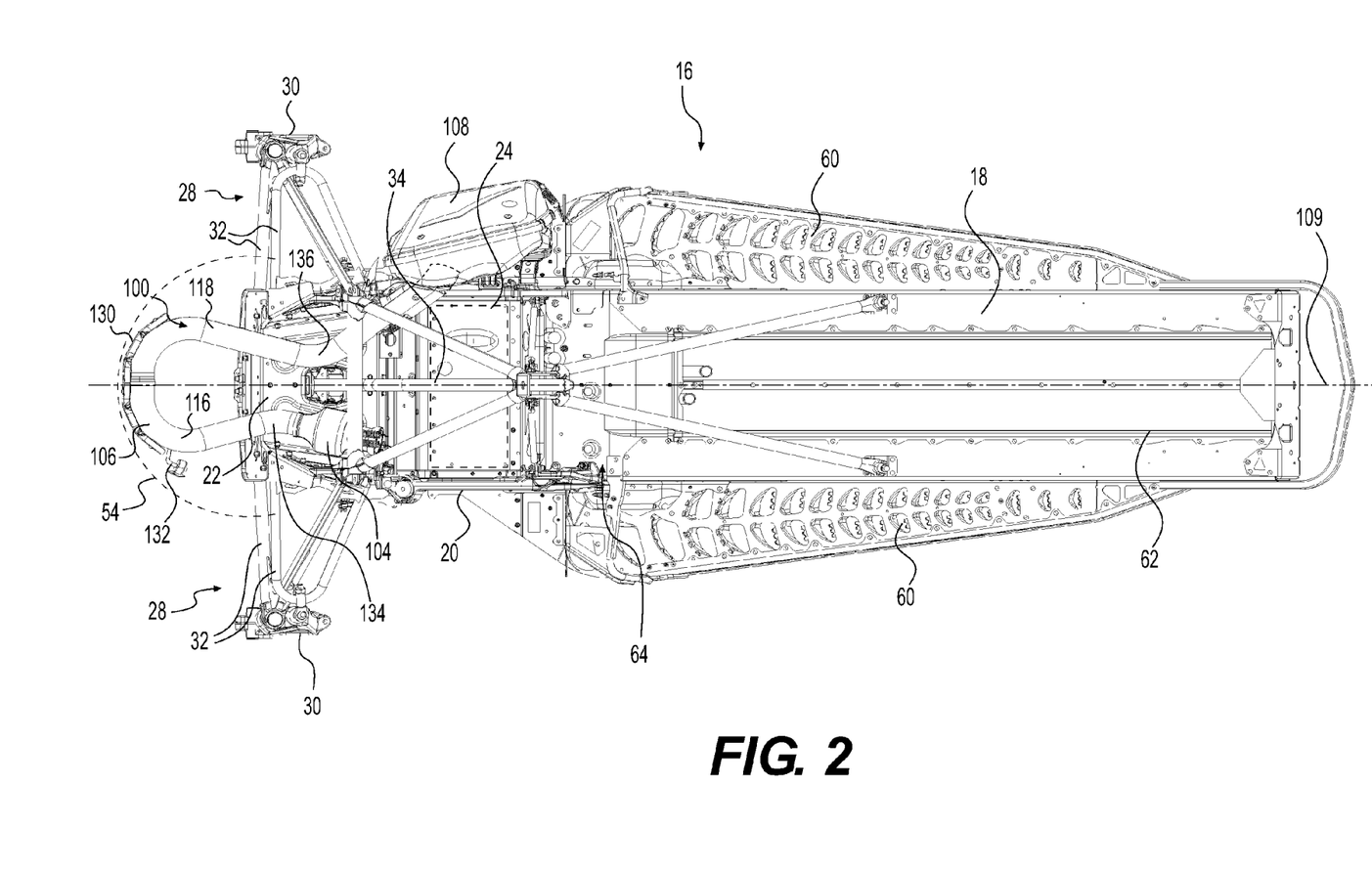
FIG. 2 is a top plan view of a frame and exhaust system of the snowmobile of FIG. 1.
Figure 3:
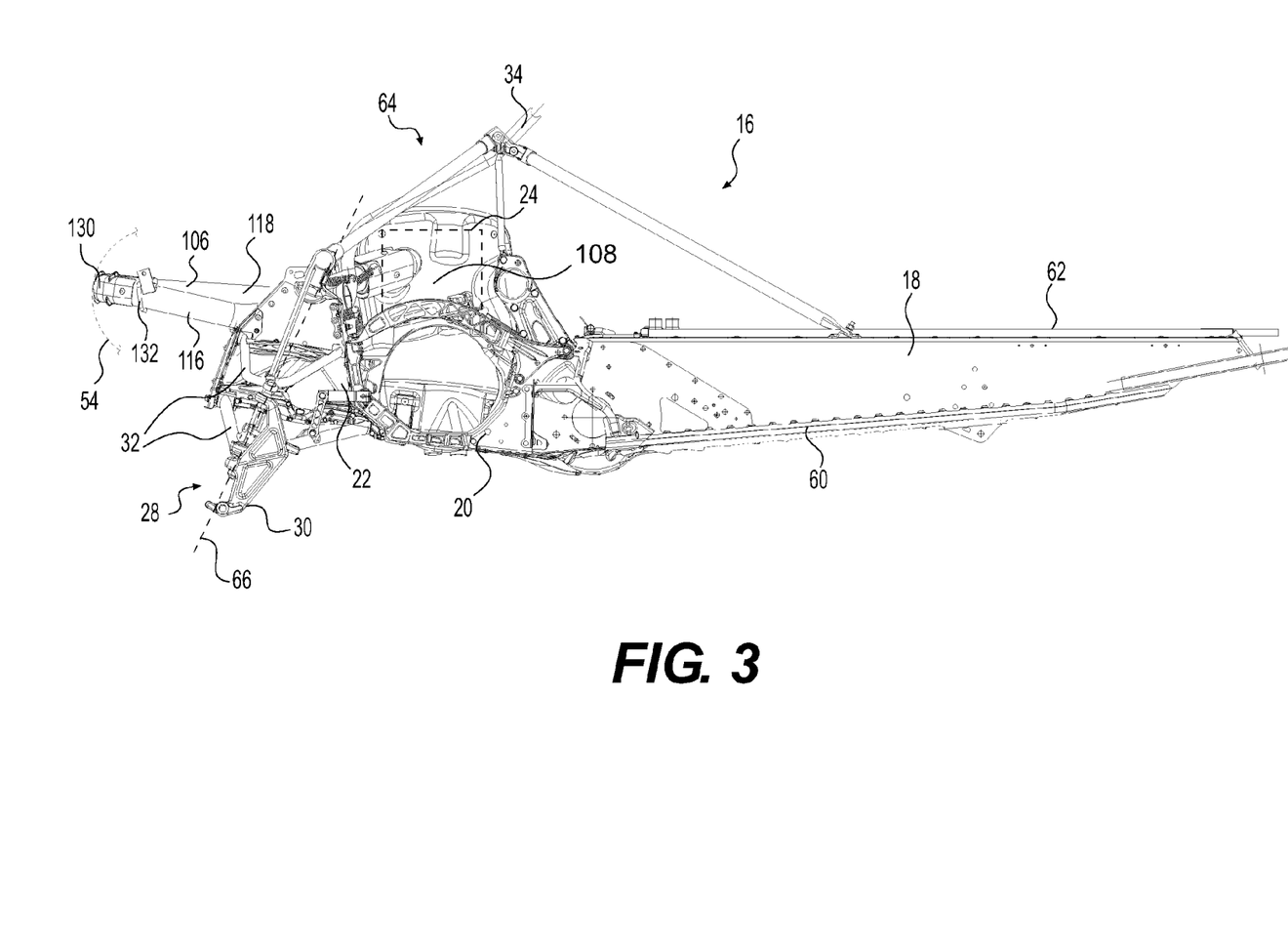
FIG. 3 is a left side elevation view of the frame and exhaust system of the snowmobile of FIG. 2.

Turning now to FIGS. 2 and 3, additional features of the frame 16 will be described.

A heat exchanger 62 is connected to the horizontal portion of the tunnel and is fluidly connected to the cooling system of the engine 24.

A pyramidal frame structure 64 is connected to the tunnel 18, the engine cradle 20, and the sub-frame 22 so as to provide additional structural rigidity to the frame 16. As can be seen, the engine 24 (shown in phantom in FIGS. 2 and 3) sits on the engine cradle 20 under the pyramidal frame structure 64. The steering column 34 passes through an apex of the pyramidal frame structure 64 so as to be supported by the pyramidal frame structure 64.

The A-arms 32 are connected the sub-frame 22. The points on the A-arms 32 where the ski legs 30 are connected define steering axes 66 (FIG. 3) of the skis 26.

Additional aspects and features of a snowmobile similar to the snowmobile 10 and of a frame similar to the frame 16 described above may be found in U.S. Pat. No. 7,124,847 B2, issued Oct. 24, 2006, the entirety of which is incorporated herein by reference.

It should be noted that the above is only an exemplary description of a snowmobile and a frame therefor. Those of ordinary skill in the art would recognize that there are other known ways of designing a snowmobile and a frame therefor and that the present invention would encompass these other known ways.

Figure 4:
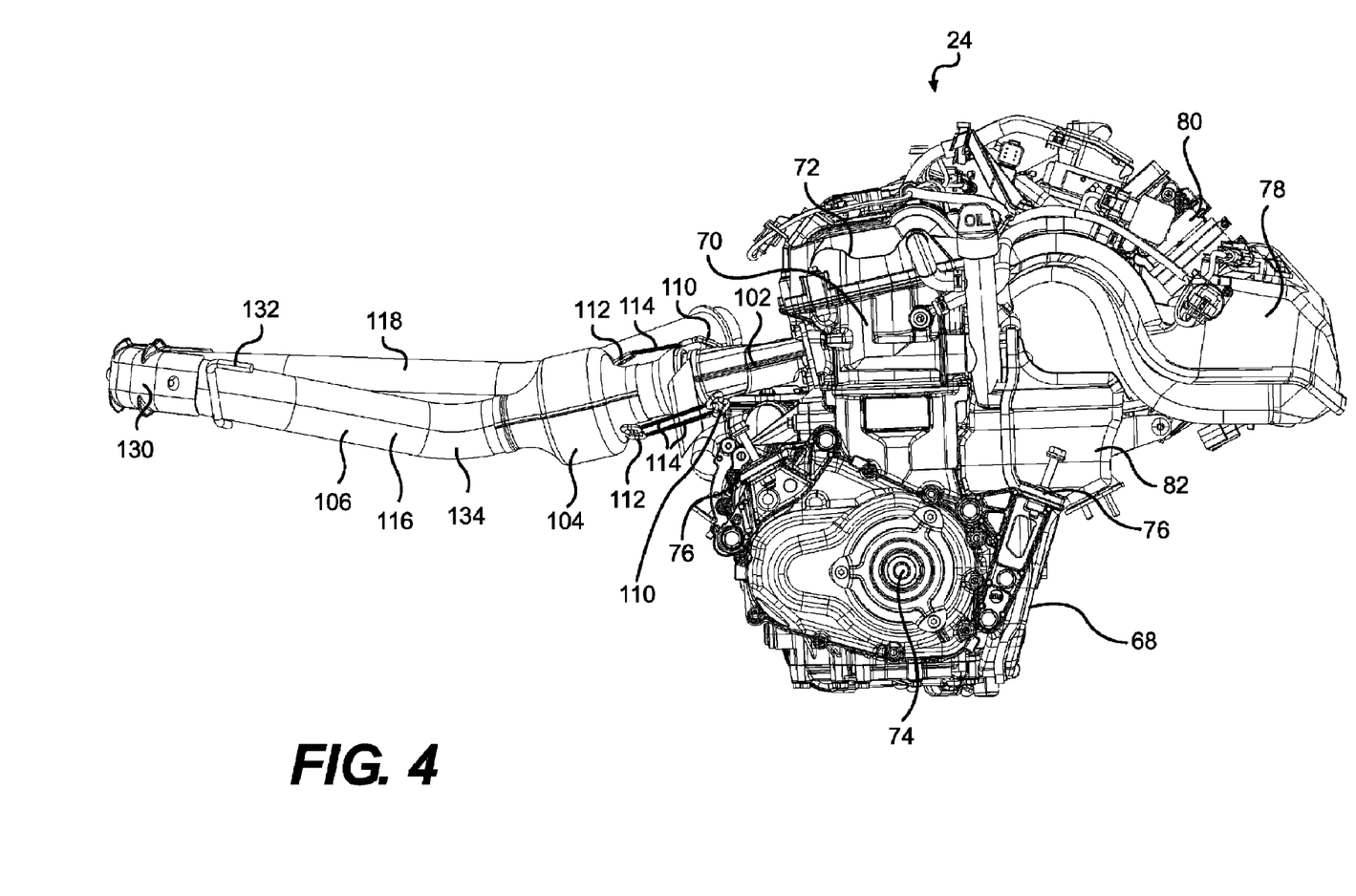
FIG. 4 is a left side elevation view of an engine of the snowmobile of FIG. 1 with elements of the exhaust system connected thereto.
Figure 5:
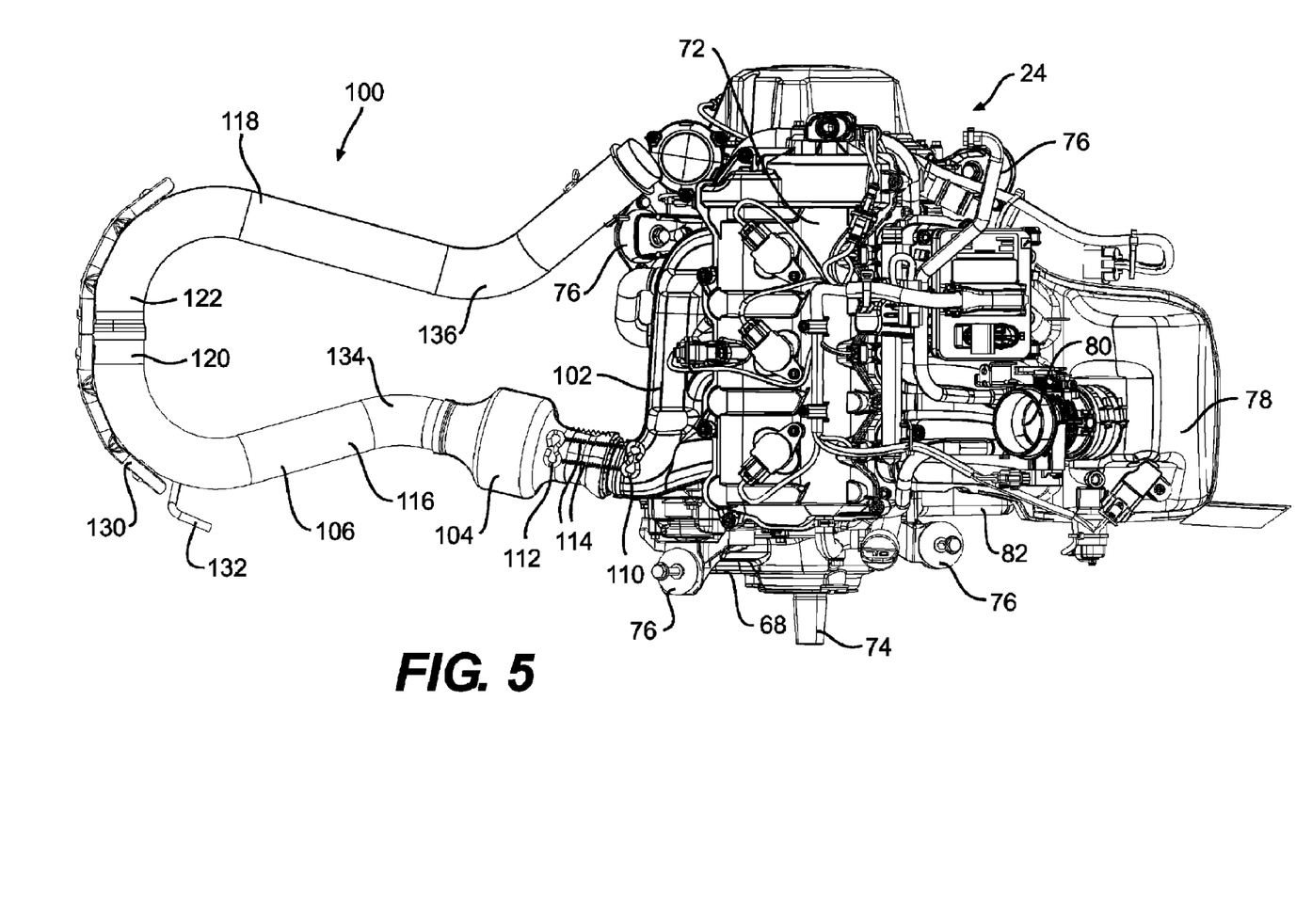
FIG. 5 is a top plan view of the engine of the snowmobile of FIG. 1 with elements of the exhaust system connected thereto FIG. 4.

Turning now to FIGS. 4 and 5, features of the engine 24 and components associated with the engine 24 will be described in more detail. The engine 24 is a three-cylinder in-line four-stroke engine. It is contemplated that other configurations of four-stroke engines could be used. The engine 24 has a crankcase 68 above which is connected a cylinder block 70. A cylinder head 72 is connected to the top of the cylinder block 70. An output shaft 74 extends from the crankcase 68 to transmit power from the engine 24 to the track 38. The engine 24 is mounted to the engine cradle 20 by a plurality of engine mounts 76 which reduce the transmission of vibrations from the engine 24 to the frame 16. The engine 24 is mounted to the engine cradle 20 such that the output shaft 74 extends laterally, the exhaust ports (not shown) face towards the front of the snowmobile 10, and the intake ports (not shown) face towards the back of the snowmobile 10.

An air intake manifold 78 is connected to the intake ports of the engine 24 and is disposed behind the engine 24. A throttle body 80 is connected to the air intake manifold 78. The throttle body 80 controls the flow of air to the engine 24. An oil tank 82 is connected to the back of the engine 24 between the engine 24 and the air intake manifold 78. An exhaust system 100, described in greater detail below, is connected to the exhaust ports of the engine 24.

As would be understood, the engine 24 has other features and components associated therewith. However, as it is believed that these other features and components, such as the electrical and the fuel injection systems, would be readily recognized by one of ordinary skill in the art, further explanation and description of these features and components will not be provided herein.

The exhaust system 100 will now be described in more detail with reference with FIGS. 2 to 6. The exhaust system 100 includes an exhaust manifold 102, a pre-muffler 104, an exhaust pipe 106, and a muffler 108.

As best seen in FIGS. 4 and 5, the exhaust manifold 102 is bolted to the front of the engine 24. The exhaust manifold 102 has three inlets and one outlet. Each of the inlets is associated with one of the exhaust ports of the engine 24. As can be seen in FIG. 2, the outlet of the exhaust manifold 102 is disposed on the left side of a longitudinal centerline 109 of the frame 16. Hooks 110 are provided near the outlet to connect the exhaust manifold 102 to the pre-muffler 104 as described below.

The pre-muffler 104 has an inlet connected to the outlet of the exhaust manifold 102 and an outlet connected to the exhaust pipe 106. The central portion of the pre-muffler 104 forms a volume having a diameter which is larger than a diameter of the inlet and outlet of the pre-muffler 104. This enlarged diameter helps in attenuating the noise from the engine 24. The outlet of the pre-muffler 104 is preferably welded to the inlet of the exhaust pipe 106, however other ways of connecting these two components are also contemplated. Hooks 112 are provided near the inlet of the pre-muffler 104. Springs 114 are connected between the hooks 112 of the pre-muffler 104 and the hooks 110 of the exhaust manifold 102, thus connecting the pre-muffler 104 to the exhaust manifold 102. This type of connection helps reduce the transmission of vibration from the engine 24 to the pre-muffler 104 and the exhaust pipe 106 and it also allows the pre-muffler 104 and the exhaust pipe 106 to be easily disconnected from the exhaust manifold 102. It is contemplated that the pre-muffler 104 could be omitted, in which case the exhaust pipe 106 would connected directly to the exhaust manifold 102.

Figure 6:
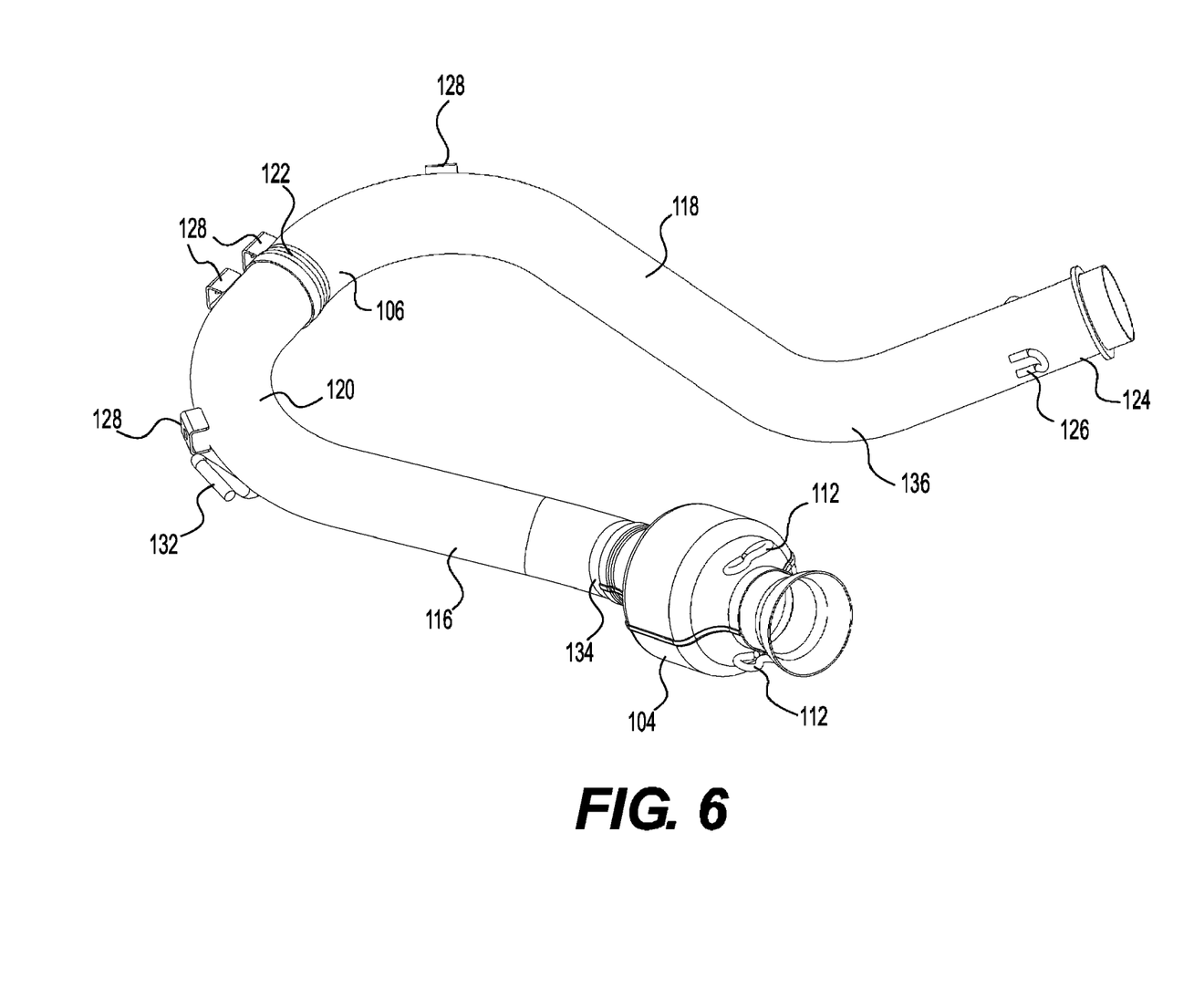
FIG. 6 is a perspective view of a pre-muffler and exhaust pipe assembly of the exhaust system.

As best seen in FIG. 6, the exhaust pipe 106 is made in two sections 116 and 118 of substantially constant diameter. It is contemplated that the exhaust pipe 106 could be made of a single section or more than two sections. The end 120 of section 116 is inserted in the end 122 of section 118 and the two are welded to together along their connection. It is contemplated that the two sections 116, 118 could be connected in other ways, such as springs and hooks connections similar to those described above. The end 124 of the section 118 is provided with hooks 126. Springs (not shown) are connected between the hooks 126 of the section 118 and hooks (not shown) on the muffler 108, thus connecting the exhaust pipe 106 to the muffler 108. As with springs 114, this connection reduces the transmission of vibrations and allows the exhaust pipe 106 to be easily disconnected from the muffler 108. A plurality of brackets 128 are provided along a front portion of the exhaust pipe 106. The brackets 128 are used to connect a heat shield 130 to the exhaust pipe 106. As seen in FIGS. 2 and 3, the heat shield 130 is disposed between the exhaust pipe 106 and the cowling 54 so as to reduce the transfer of heat from the exhaust pipe 106 to the cowling 54 while the engine 24 is operating. A pin 132 extends from the section 116 of the exhaust pipe 106. The pin 132 is received in a bracket (not shown) connected to a portion (not shown) extending from the sub-frame 20 so as to support the front of the exhaust pipe 106.

As best seen in FIGS. 2 and 5, the exhaust pipe 106 extends forwardly from the pre-muffler 104 to a point forwardly of both a front of the engine cradle 20 and the A-arms 32, crosses the centerline 109, and then extends rearwardly so as to generally form a U-shape. The outlet of the exhaust pipe 106 is disposed inside the muffler 108 (as shown in phantom in FIG. 2) and the muffler 108 communicates with the atmosphere. As can be seen, the muffler 108 is disposed to the right of the engine 24 longitudinally between the right suspension assembly 28 and the right footrest 60.

More specifically, the exhaust pipe 106 first extends forwardly from the pre-muffler 104 and towards the longitudinal centerline 109, it then extends forwardly and away from the longitudinal centerline 109, it then extends forwardly and to the longitudinal centerline 109. From the longitudinal centerline 109, the exhaust pipe extends rearwardly and away from the longitudinal centerline 109, it then extends rearwardly and towards the longitudinal centerline 109, and it finally extends rearwardly and away from the longitudinal centerline 109 and enters the muffler 108. By arranging the exhaust pipe 106 in this manner, the exhaust pipe 106 goes around the steering column 34 such that the steering column 34 is disposed laterally between the rear portions of sections 116 and 118 and behind the front of the exhaust pipe 106. Also, by having elbows 134 and 136 that are formed in the exhaust pipe 106 located closer to the longitudinal centerline 109, the exhaust pipe can be routed between the legs of the pyramidal frame structure 64 and the sub-frame 22. As can be seen in FIGS. 2 and 5, the elbow 134 is disposed forwardly of the elbow 136, which results in the exhaust pipe 106 being asymmetric about the longitudinal centerline 109.

By routing the exhaust pipe 106 as described above, the exhaust pipe 106 can be sufficiently long so as to obtain the desired noise reduction. The exhaust pipe 106 preferably reduces engine noise perceived by a driver of the snowmobile 10 by at least 6 decibels. The exhaust pipe 106 preferably has a length, as measured along its centerline, that corresponds to ¼ of the wavelength of the frequency of the noise that is to be attenuated. The same length of exhaust pipe 106 will also attenuate the noise created at frequencies for which the length of the exhaust pipe 106 corresponds to ¾, 1¼, 1¾, and 2¼ (and so on) of the wavelength of these frequencies. As would be understood, the actual frequencies that will be attenuated will vary depending on the temperature of the exhaust gases. The length of the exhaust pipe 106 is preferably between 1200 mm and 2000 mm and the exhaust pipe has a diameter of less than 70 mm. The exhaust pipe 106 preferably extends inside the muffler 108. However, the portion of the exhaust pipe 106 that extends inside the muffler 108 is preferably has a length that is less than 20% of the overall length of the exhaust pipe 106. In a preferred embodiment, the exhaust pipe 106 is 1310 mm long (160 mm of which are disposed in the muffler 108), and has a diameter of 50.8 mm (2 inches).

Due to the length of the exhaust pipe 106, the exhaust gases flowing through the exhaust pipe 106 have additional time to cool, and the exhaust gases enter the muffler 108 at a temperature which is lower than if the exhaust pipe 106 was routed so as to connect the engine 24 to the muffler 108 with the shortest length of exhaust pipe 106 possible. The lower temperature means that the acoustic wavelengths (for the same frequency) of noise entering the muffler 108 are shorter, which allows the structure of the muffler 108 to be relatively simple.

For example, at an engine speed of 4600 RPM, an exhaust pipe 106 according the present invention having a length of 1310 mm reduces engine noise by 10 to 12 more decibels than an exhaust pipe having a length of 470 mm. About 90 percent of that difference is due to the additional length of the exhaust pipe 106 and the rest is due to the lower temperature of the exhaust gases that enter the muffler 108.

It should be understood that the arrangement of the exhaust system 100 described above could be a mirror image of what has been described (i.e. with the outlet of the exhaust manifold 102 on the right side of the centerline 109 and the muffler 108 on the left side of the centerline 109).

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A snowmobile comprising:
    a frame including a tunnel and an engine cradle forward of the tunnel;
    a four-stroke engine mounted in the engine cradle, the engine having exhaust ports;
    a drive track disposed below and operatively connected to the tunnel, the drive track being operatively connected to the engine for propulsion of the snowmobile;
 left and right skis connected to the frame;
    a left suspension assembly connecting the left ski to the frame;
    a right suspension assembly connecting the right ski to the frame;
    a straddle seat disposed on the tunnel above the drive track and rearwardly of the engine;
    a pair of footrests supported by the frame;
    a steering column operatively connected to the left and right skis;
    a handlebar connected to the steering column; and
    an exhaust system connected to the engine, the exhaust system including:
        an exhaust manifold fluidly communicating with the exhaust ports of the engine, the exhaust manifold having an outlet;
        a pre-muffler fluidly communicating with the outlet of the exhaust manifold and extending forwardly from the exhaust manifold;
        springs connecting the pre-muffler to the exhaust manifold;
        a generally U-shaped exhaust pipe extending forwardly from the pre-muffler to a first point disposed forwardly of the engine cradle and of the suspension assemblies, and extending rearwardly from the first point to a second point disposed rearwardly of a front of the engine cradle, the exhaust pipe having a substantially constant diameter, the pre-muffler fluidly communicating the outlet of the exhaust manifold with the exhaust pipe, and a maximum diameter of the pre-muffler being greater than the substantially constant diameter of the exhaust pipe; and
        a muffler fluidly communicating the exhaust pipe with the atmosphere, at least a portion of the muffler being disposed rearwardly of the front of the engine cradle and to one lateral side of the engine, the muffler and the outlet of the exhaust manifold are disposed on opposite sides of a longitudinal centerline of the frame;
    wherein the exhaust pipe has first, second, third, fourth, fifth, and sixth portions;
    wherein the first portion extends forwardly from the pre-muffler and towards a longitudinal centerline of the frame;
    wherein the second portion extends forwardly from the first portion and away from the longitudinal centerline;
    wherein the third portion extends forwardly from the second portion and towards the longitudinal centerline;
    wherein the fourth portion extends rearwardly from the third portion and away from the longitudinal centerline;
    wherein the fifth portion extends rearwardly from the fourth portion and towards the longitudinal centerline;
    wherein the sixth portion extends rearwardly from the fifth portion and away from the longitudinal centerline, a rear portion of the sixth portion extends inside the muffler;
    wherein the first, second, and third portions are disposed on a first side of the longitudinal centerline and the fourth, fifth, and sixth portions are disposed on a second side of the longitudinal centerline; and
    wherein a connection between the first and second portions and a connection between the fifth and sixth portions are disposed laterally inwardly of lateral sides of the engine.

2. The snowmobile of claim 1, wherein the second point is disposed rearwardly of the left and right suspensions.

3. The snowmobile of claim 2, wherein an outlet of the exhaust pipe is disposed forwardly of the footrests.

4. The snowmobile of claim 1, wherein a connection between the first and second portions is disposed forwardly of a connection between the fifth and sixth portions.

5. The snowmobile of claim 1, wherein the exhaust pipe is asymmetric about the longitudinal centerline.

6. The snowmobile of claim 1, wherein the exhaust ports of the engine face towards a front of the snowmobile.

7. The snowmobile of claim 6, wherein the outlet of the exhaust manifold is a single outlet.

8. The snowmobile of claim 1, wherein a length of the pre-muffler is less than a length of the exhaust pipe.

9. The snowmobile of claim 1, wherein the muffler is disposed forwardly of one of the footrests.

10. The snowmobile of claim 1,
wherein a length of the rear portion of the sixth portion of the exhaust pipe extending inside the muffler is less than 20 percent of a length of the exhaust pipe.

11. The snowmobile of claim 1, wherein each of the left and right suspension assemblies includes at least one A-arm; and
wherein the first point is disposed forwardly of a portion of the A-arms.

12. The snowmobile of claim 11, wherein each A-arm defines a steering axis about which a corresponding one of the left and right skis pivots; and
wherein the first point is disposed forwardly of the steering axes.

13. The snowmobile of claim 1, further comprising:
a cowling connected to a forward portion of the frame and at least partially disposed around the exhaust pipe; and
a heat shield disposed between the cowling and a portion of the exhaust pipe.

14. The snowmobile of claim 1, wherein the exhaust pipe is at least 1200 mm long.

15. The snowmobile of claim 14, wherein a diameter of the exhaust pipe is less than 70 mm.

16. The snowmobile of claim 14, wherein the exhaust pipe reduces engine noise by at least 6 decibels.

* * * * *